US006868061B1

(12) United States Patent
Kilkki et al.

(10) Patent No.: US 6,868,061 B1
(45) Date of Patent: Mar. 15, 2005

(54) SYSTEM AND METHOD FOR PRE-FILTERING LOW PRIORITY PACKETS AT NETWORK NODES IN A NETWORK SERVICE CLASS UTILIZING A PRIORITY-BASED QUALITY OF SERVICE

(75) Inventors: Matti Kalevi Kilkki, Lexington, MA (US); Jussi Pekka Olavi Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/209,183

(22) Filed: Dec. 10, 1998

(51) Int. Cl.⁷ .............................................. H04L 12/24
(52) U.S. Cl. .................................... 370/230.1; 370/235
(58) Field of Search ................................. 370/230, 231, 370/232, 233, 234, 235, 252, 395.21, 395.42, 395.43, 400, 401

(56) References Cited

U.S. PATENT DOCUMENTS

| | | | | |
|---|---|---|---|---|
| 4,953,157 A | * | 8/1990 | Franklin et al. ............. | 370/230 |
| 5,153,877 A | | 10/1992 | Esaki et al. ................. | 370/94.1 |
| 5,287,347 A | | 2/1994 | Spanke ........................ | 370/60 |
| 5,313,454 A | * | 5/1994 | Bustini et al. ............... | 370/231 |
| 5,410,585 A | | 4/1995 | Kawaharata .................... | 379/6 |
| 5,426,640 A | * | 6/1995 | Hluchyj et al. ............. | 370/94.1 |
| 5,541,852 A | * | 7/1996 | Eyboglu et al. ............. | 364/514 |
| 5,541,913 A | | 7/1996 | Witters et al. ................. | 370/17 |
| 5,553,061 A | | 9/1996 | Waggener, Jr. et al. ....... | 370/17 |
| 5,557,608 A | | 9/1996 | Calvignac et al. ............ | 370/60 |
| 5,600,641 A | | 2/1997 | Duault et al. ............... | 370/400 |
| 5,638,359 A | | 6/1997 | Peltola et al. ............... | 370/229 |
| 5,708,660 A | | 1/1998 | Riedel ........................ | 370/397 |
| 5,748,615 A | | 5/1998 | Riedel et al. ............... | 370/238 |
| 5,757,784 A | | 5/1998 | Liebowitz et al. .......... | 370/321 |

(List continued on next page.)

FOREIGN PATENT DOCUMENTS

EP 0 275 679 7/1988 .......... H04L/11/20

OTHER PUBLICATIONS

"Traffic Control and Congestion Control in B–ISDN", *ITU–T Recommendation I.371*, pp. 1–27 (Mar. 1993).
"ATM Service Categories: The Benefits to the User", http://www.atmforum.com/atmforum/service‾categories.html, last updated Aug. 22, 1996, pp. 1–10.
"What are the Meaning of CBR, VBR, ABR, UBR?", http://cell–relay.indiana.edu/cell–relay/FAQ/ATM–FAQ/d/d19.htm, last updated Aug. 20, 1996, pp. 1–2.
"ATM Lecture", http://syllabus.syr.edu/Ist/Mweschen/Ist656/Week4/lecture/atm/atm.htm, pp. 1–5.
"Traffic Management Specification Version 4.0", *ATM Forum Technical Committee*, pp. 1–59 (Apr. 1996).
K. Kilkki, *Simple Integrated Media Access (SIMA)*, IETF Internet Draft, Internet–Draft, Jun. 1997, pp. 1–25.
K. Kilkki, *High Quality and High Utilization Incompatible objectives for the Internet?*, IEEE 1998 Sixth International Workshop on Quality of Service, 1998, pp. 65–67.

*Primary Examiner*—Chau Nguyen
*Assistant Examiner*—Duc Duong
(74) *Attorney, Agent, or Firm*—Squire, Sanders & Dempsey LLP

(57) ABSTRACT

A system and method for reducing network node congestion by filtering out comparatively low priority packets prior to execution of other node functions, such as routing and switching, in packet-based network transmissions. The volume of packets is reduced by intercepting the information packets prior to their input to the network node. A portion of the intercepted packets are filtered out based on parameters corresponding to a probable packet acceptability at the network node. The remaining portion of the intercepted packets are forwarded to the network node for processing by the network packet functions.

8 Claims, 14 Drawing Sheets

U.S. PATENT DOCUMENTS

| | | | |
|---|---|---|---|
| 5,768,521 A | 6/1998 | Dedrick | 370/200.54 |
| 5,768,627 A | 6/1998 | Jones et al. | 395/880 |
| 5,784,358 A | 7/1998 | Smith et al. | 370/230 |
| 5,790,522 A | 8/1998 | Fichou et al. | 370/236 |
| 5,805,577 A | 9/1998 | Jain et al. | 370/234 |
| 5,805,585 A | 9/1998 | Javitt et al. | 370/342 |
| 5,812,527 A | 9/1998 | Kline et al. | 370/232 |
| 5,818,818 A | 10/1998 | Soumiya et al. | 370/252 |
| 5,828,653 A | 10/1998 | Goss | 370/230 |
| 5,838,922 A | 11/1998 | Galand et al. | 395/200.56 |
| 6,041,039 A * | 3/2000 | Kikki et al. | 370/230 |
| 6,052,734 A * | 4/2000 | Ito et al. | 709/235 |
| 6,081,843 A * | 6/2000 | Kikki et al. | 709/232 |
| 6,147,970 A * | 11/2000 | Troxel | 370/235 |
| 6,222,841 B1 * | 4/2001 | Taniguchi | 370/389 |
| 2001/0022786 A1 * | 9/2001 | King et al. | 370/412 |

* cited by examiner

SYSTEM AND METHOD FOR PRE-FILTERING LOW PRIORITY PACKETS AT NETWORK NODES IN A NETWORK SERVICE CLASS UTILIZING A PRIORITY-BASED QUALITY OF SERVICE

FIELD OF THE INVENTION

The present invention relates generally to network communications systems, and more particularly, to a method and apparatus for reducing network node congestion by filtering out comparatively low priority packets prior to execution of other node functions such as routing and switching.

BACKGROUND OF THE INVENTION

The state of communications technology, particularly that which affects the Internet, is currently in flux and subject to rapid and often uncoordinated growth. The ubiquity and diversity of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Notwithstanding the complexity of conventional ATM traffic management schemes, current ATM specifications and recommendations fail to adequately address the need of service providers for a methodology that provides for accurate and reliable charging of services utilized by user's of the network. Even if one were to assume that a charging scheme that accounts for most or all of the currently defined ATM traffic management properties could be developed, such a scheme would necessarily be complex and would typically require administration by highly skilled operators. The high overhead and maintenance costs to support such a billing scheme would likely be passed on to the network provider and, ultimately, to the network user.

The present invention is applicable in a network service class which incorporates a priority-based quality of service. This service class, hereinafter referred to as the Simple Integrated Media Access (SIMA) service class, provides a network management architecture that is simple in concept and in its implementation, yet adequately addresses the quality of service requirements to support a variety of network services, including real-time and non-real-time services. It also provides for the implementation of a simple and effective charging capability that accounts for the use of network services.

In a SIMA, or non-SIMA network, incoming packets at a network node are received at one of a number of node inputs, and are made subject to node routing, switching, and/or multiplexing functions to direct the packets to their respective node output ports. Multiplexing is the means by which multiple streams of information share a common physical transmission medium. Switching takes multiple instances of a physical transmission medium, and rearranges the information streams between the input and output. A router is a network device operating at multiple layers of the Open Systems Interconnection Reference Model (OSIRM), including the network layer, and is capable of switching and routing data based upon network protocols. These, and similar functions, are performed at the nodes of the network to guide the packets to their respective destinations.

In a network incorporating a priority-based service class, such as SIMA, each network node is equipped with cell scheduling and buffering modules capable of recognizing an incoming packet or cell priority, and accepting or discarding the packet based on an accepted priority associated with that particular node. The accepted node priority may change depending on the level of packet traffic traversing the node. Each output of the node includes such a cell scheduling and buffering module.

A network node configuration that includes routing, switching or multiplexing functions (hereinafter collectively referred to as "switching functions"), followed by cell scheduling and buffering at each node output, performs switching functions on all received packets. When these packets are directed to their appropriate node output, they can be discarded at each node output where the packet priority is insufficient to meet the accepted node priority. While this advantageously allows the higher priority packets to be output from the network node, it does not alleviate the burden of the routing functions which still needs to process packets that may ultimately be discarded.

For example, problems may arise at a SIMA network node where a certain input(s) receives a large amount of SIMA packets that cannot be forwarded due to the overall load of the network node. In such a case, the primary problem is that the routing within a node is performed on all packets even though many of them will ultimately be discarded by the cell scheduling and buffering functions at the node outputs. Thus, the excess, low priority packet traffic to the input(s) of a SIMA core network node could potentially overload the node routing/switching unit.

Similar problem may arise where SIMA packets are forwarded through a conventional network node without SIMA support. It is possible that the particular input(s) serving SIMA traffic may overload the routing function of the conventional network node. This is especially true with an IP router that typically handles routing in a centralized unit based on software. In this case, the routing function can be a bottleneck of the IP router, even without excess SIMA traffic.

Accordingly, there is a need for a system and method for alleviating packet traffic congestion adversely affecting the switching functions of a network node. The present invention therefore reduces the likelihood of the network node becoming overloaded, thereby overcoming this and other shortcomings of the prior art, and offering additional advantages over the prior art.

SUMMARY OF THE INVENTION

The present invention is directed to a system and method for reducing network node congestion by filtering out comparatively low priority packets prior to execution of other node functions such as routing and switching, in packet-based transmissions implementing a priority-based quality of service, or alternatively in packet-based transmissions which do not implement a priority-based quality of service.

In accordance with one embodiment of the invention, a method for reducing the volume of packets requiring processing by network packet functions of a network node is provided. The method is applicable for use in networks having at least one network node capable of routing information packets between one or more node inputs and one or more node outputs. The information packets are intercepted prior to their input to the network node. A portion of the intercepted packets are filtered out based on parameters corresponding to a probable packet acceptability at the network node. The remaining portion of the intercepted packets are forwarded to the network node for processing by the network packet functions.

In accordance with another embodiment of the invention, a method for reducing the volume of packets requiring processing by network packet functions of the network node is provided. The network includes at least one network node capable of routing information packets between one or more node inputs and one or more node outputs. Parameters indicative of a desired packet traffic flow are established, and the packets destined for a particular one of the inputs of the network node are intercepted prior to their input to the particular network node input. Attributes of the intercepted packets are compared with the established parameters to determine whether the attributes conform to the established parameters, and those of the intercepted packets whose attributes do not conform to the established parameters are discarded. The intercepted packets whose attributes conform to the established parameters are forwarded to the particular input to which the intercepted packet was destined.

In accordance with yet another embodiment of the invention, a method for reducing the volume of packets requiring processing by network packet functions of the network node is provided for use in a network having at least one network node capable of routing information packets between node inputs and node outputs. The packets destined for a particular one of the inputs of the network node are intercepted prior to their input to the particular input. The intercepted packets are loaded into a memory queue if the memory queue has available capacity, and if the memory queue has no available capacity, the intercepted packets are discarded. The remaining intercepted packets from the memory queue are forwarded to the particular input to which the intercepted packet was destined.

In accordance with another aspect of the invention, a packet pre-filtering device for use in a network having at least one network node capable of routing information packets between network node inputs and network node outputs is provided. Each of the packets includes a packet priority value, and a packet filter input intercepts the packets destined for a particular one of the network node inputs. A control input receives parameters corresponding to a packet acceptance threshold, and a comparator compares the packet acceptance threshold to the packet priority values from the intercepted packets. A packet filter output forwards the intercepted packets having a packet priority value within the packet acceptance threshold to the particular one of the network node inputs to which the intercepted packet was destined.

In accordance with another embodiment of the invention, a packet pre-filtering device is provided for use in a network having at least one network node capable of routing information packets between network node inputs and network node outputs. The network in this case need not be capable of recognizing priorities such as those implemented in a SIMA network. A packet filter input intercepts the packets destined for a particular one of the network node inputs. A buffer is coupled to the packet filter input to receive and temporarily queue the intercepted packets prior to being forwarded to a particular one of the network node inputs to which the intercepted packet was destined. A buffer occupancy level detector determines whether the occupancy level of the buffer has reached a predetermined occupancy level, and the intercepted packets are forwarded to the buffer only when the occupancy level of the buffer is below the predetermined occupancy level.

In accordance with still another embodiment of the invention, a network system is provided for reducing network congestion. The network system reduces network congestion by prohibiting the transmission of network packets having a priority lower than a packet acceptance threshold. The system includes a plurality of network nodes, each capable of receiving network packets and routing the network packets to other ones of the network nodes, or to a destination node. A packet pre-filtering device is provided, where one of the packet pre-filtering devices coupled to an input of each of the plurality of network nodes. The packet pre-filtering device intercepts the network packets destined for its associated network node, and filters out those network packets having a priority lower than the packet acceptance threshold.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made, without departing from the scope of the invention.

The present invention is directed to a system and method for reducing the volume of packets requiring processing by network packet functions of the network node. Packets destined for a particular network node are intercepted by a pre-filtering unit prior to their input to the network node. Those of the intercepted packets that have a low priority, less than a selected threshold, are filtered out of the network before routing and switching is performed on those low priority packets. The remaining packets are forwarded to the network node for processing, such as routing and switching.

A network implemented in accordance with the principles of the present invention provides a priority-based quality of service, such as with the SIMA service class that incorporates a nominal bit rate (NBR). While the filtering method and system according to the present invention may be applicable to different conventional network switching systems, an appreciation of the principles of the invention is best obtained in the context of the following diagrams, in which a SIMA network service class is shown and described in accordance with the present invention.

The realization and benefits of a SIMA network may be determined in a manner described herein and in copending U.S. patent application Ser. No. 08/821,273 entitled "Nominal Bit Rate Network Service", filed on Mar. 20, 1997, which is assigned to the assignee of the instant application, the contents of which are incorporated herein by reference. However, to obtain an understanding of a network incorporating a SIMA service class, the SIMA nominal bit rate (NBR) concept is described generally below.

Figure 1:
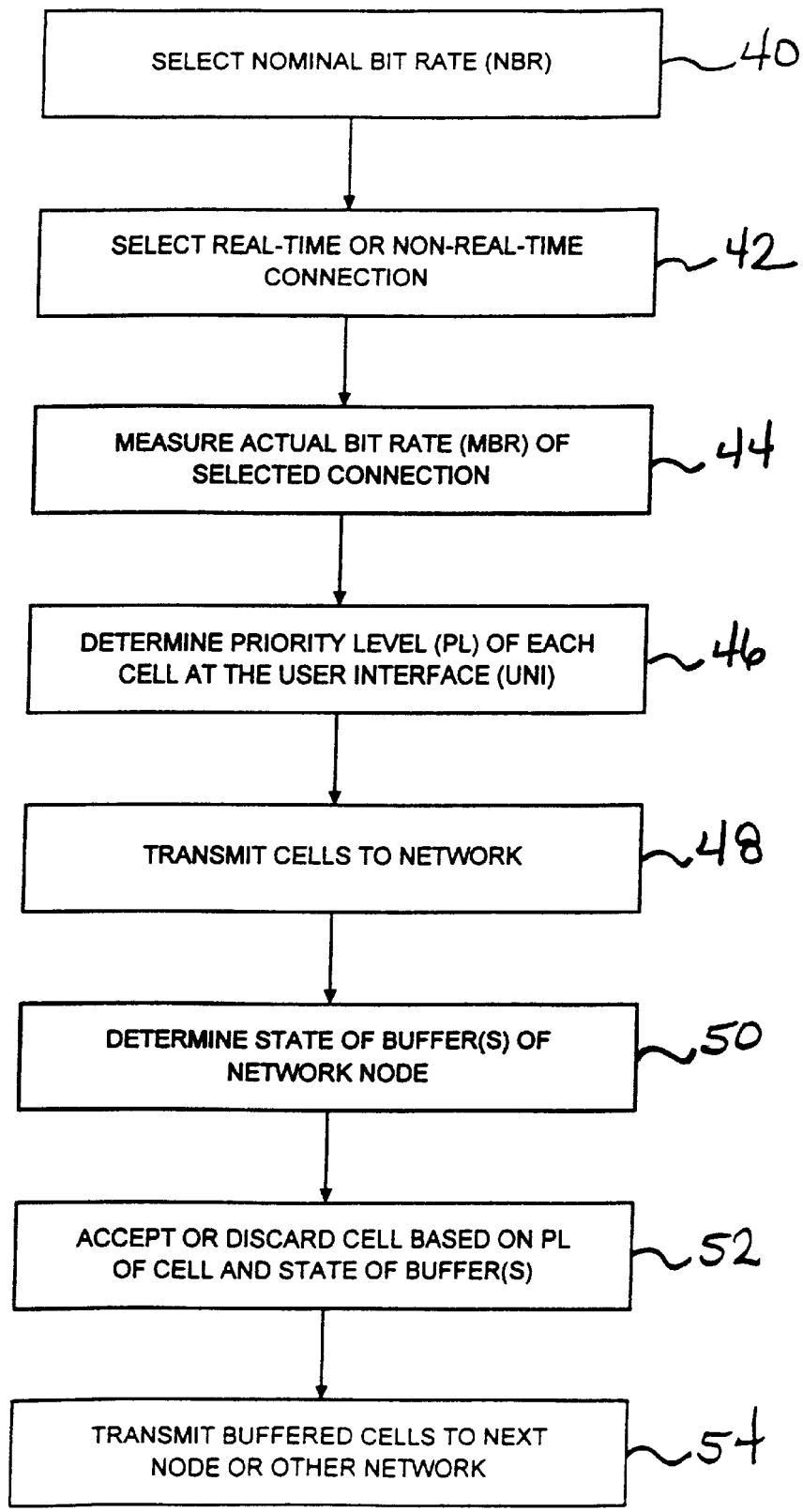
FIG. 1 is a flow diagram illustrating a general procedure for communicating cells of information between a user/network interface and a network using a nominal bit rate service in accordance with the present invention.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI. In one embodiment of the invention, a ratio of the MBR and the NBR is used to determine 46 the PL.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
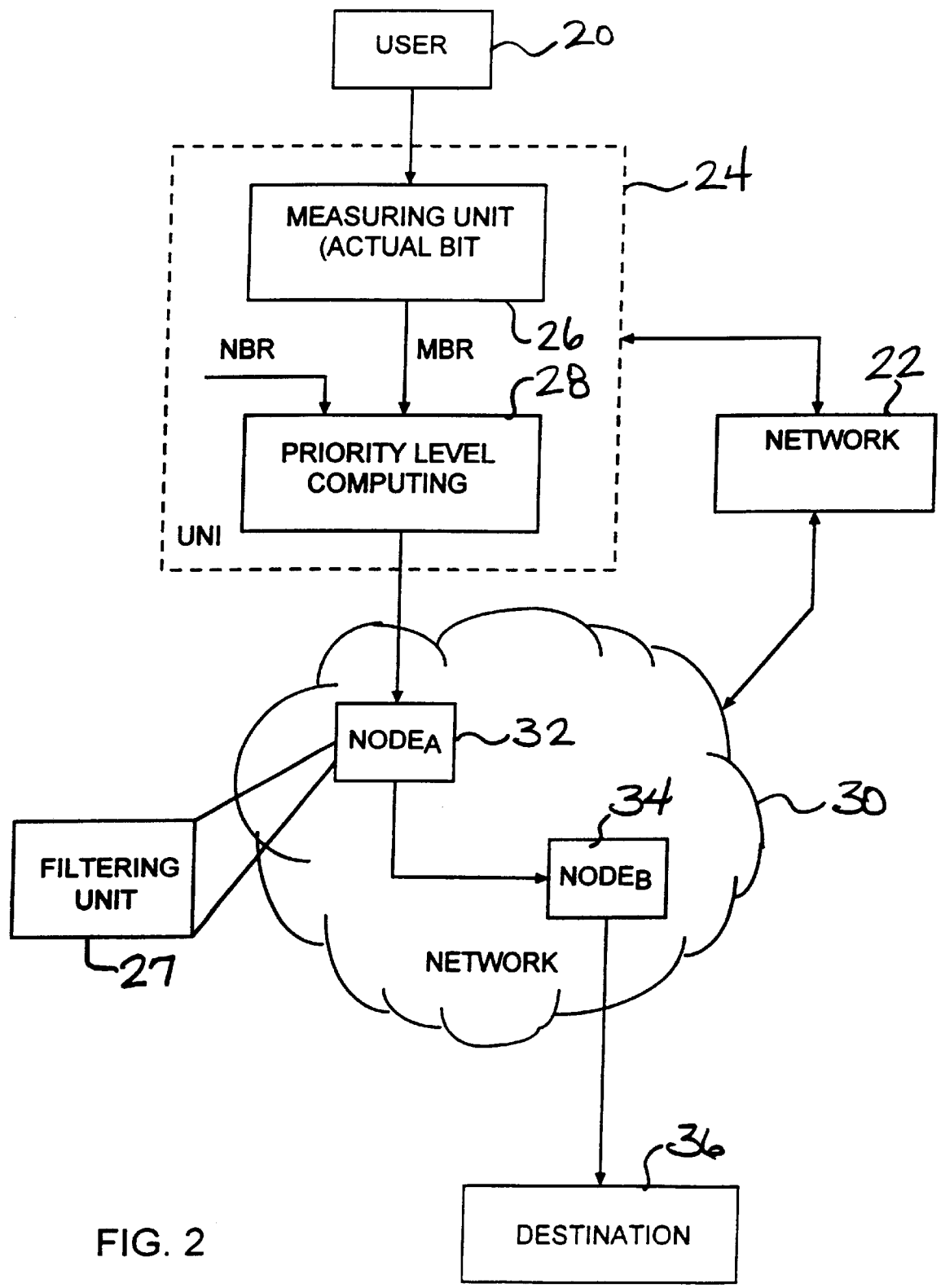
FIG. 2 is a system block diagram of a nominal bit rate service architecture in accordance with the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as $node_{A\ 32}$. The $node_{A\ 32}$ accepts or discards the cell received from the UNI 24 based on the priority level of the cell and the buffering capacity of $node_{A\ 32}$. In general, as the occupancy of the buffer or memory of $node_{A\ 32}$ increases (i.e., becomes more filled), cells having a lower priority (i.e., higher priority level value) are discarded in favor of accepting cells having a higher priority (i.e., lower priority level value). As the occupancy level of the buffer of $node_{A\ 32}$ decreases (i.e., becomes less filled), the $node_{A\ 32}$ becomes increasingly tolerant toward accepting cells of lower priority (i.e., higher priority level values). Cells that are buffered in $node_{A\ 32}$ are subsequently transmitted to another node in the network 30, such as $node_{B\ 34}$, or other network and, ultimately, to an end-destination 36.

The exemplary network 30 used for purposes of this description is depicted as a network having two intermediary nodes 32 and 34. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 3:
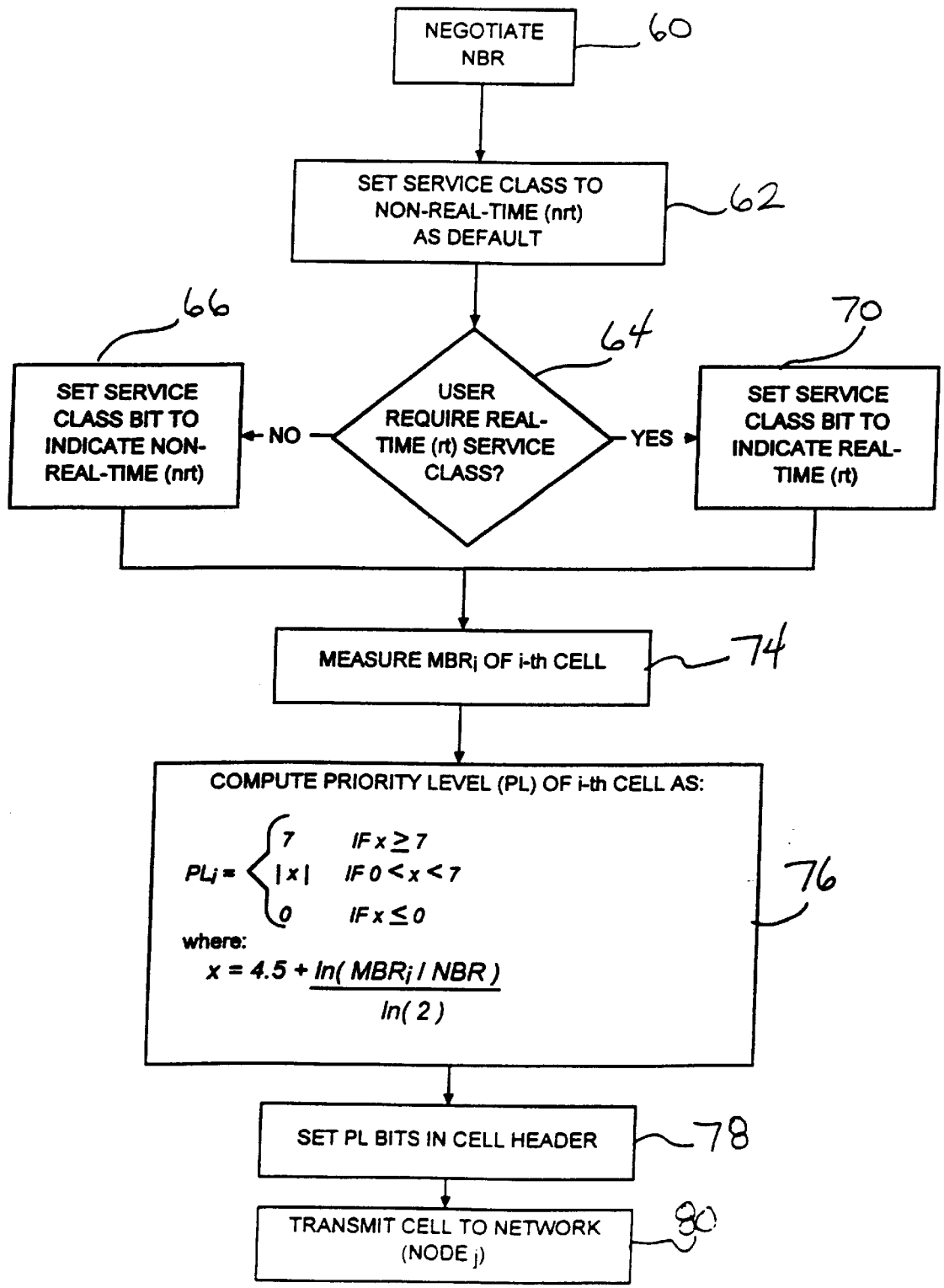
FIG. 3 illustrates in greater detail a procedure for transmitting cells of information between a user/network interface and a network using a nominal bit rate service in accordance with the present invention.
Figure 4:
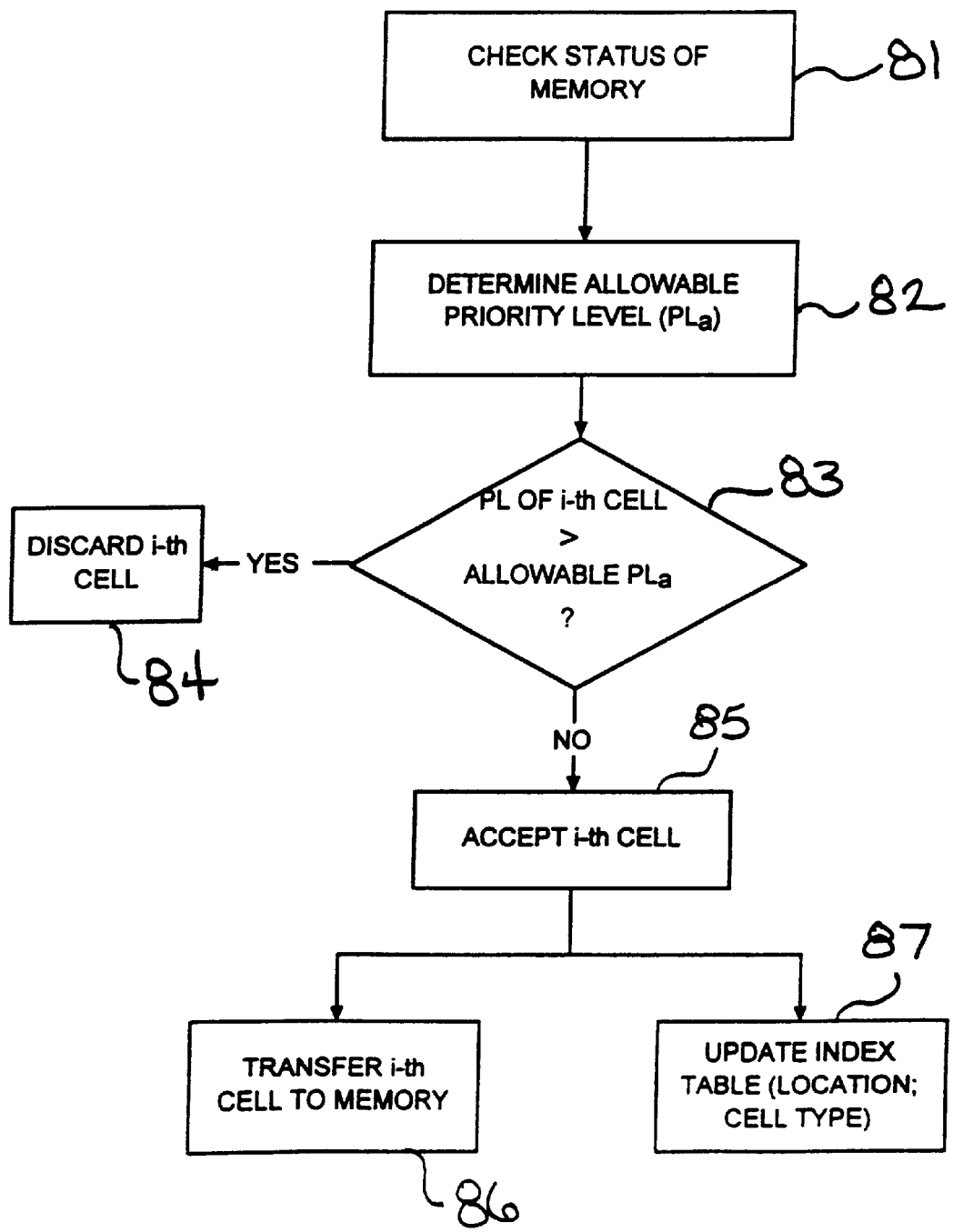
FIG. 4 illustrates in flow diagram form a general procedure for filtering cells at a network node in a nominal bit rate service.
Figure 5:
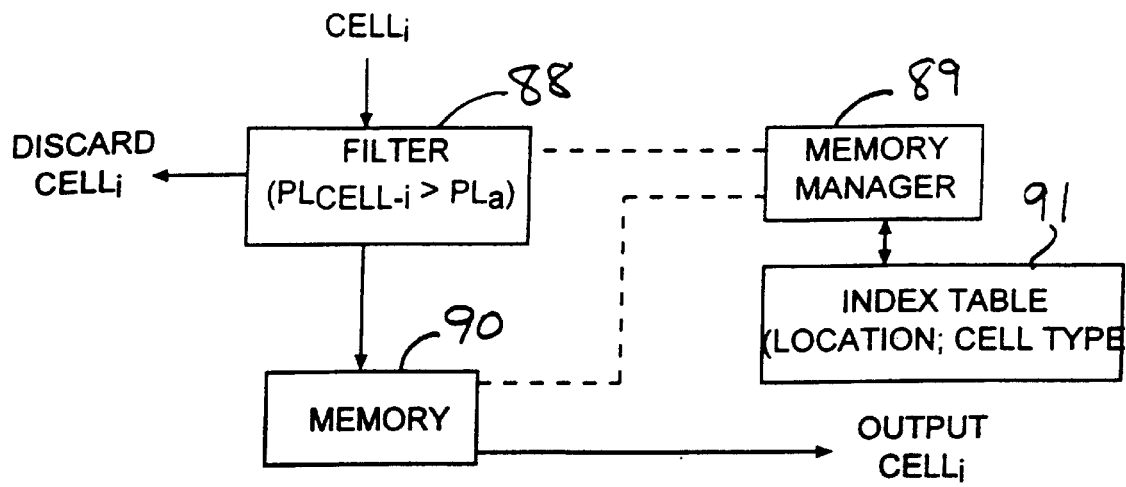
FIG. 5 is a block diagram of an embodiment of a system for filtering cells at a network node in accordance with a nominal bit rate service.

FIGS. 3–5 illustrate a procedure for scheduling and buffering cells in accordance with one embodiment of an NBR service methodology. Referring now to FIG. 3, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, $MBR_i$.

In general, the UNI measures 74 the actual bit rate of a cell, such as cells, by approximating the actual or instantaneous bit rate of the connection within a measuring period having a duration that is appropriate for the particular connection (e.g., a real-time or non-real-time connection). The present invention provides for the measurement of the instantaneous bit rate, $MBR_i$.

Having determined 74 the measured bit rate, $MBR_i$ of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header.

The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n-bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as cell$_i$. In accordance with one embodiment of the present invention, and assuming that level ($PL_i$) of cells may be calculated using the following equation:

$$x = 4.5 + \frac{\ln(MBR_i/NBR)}{\ln(2)} \qquad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, [x] represents the integer part of x. The present invention provides for the determination of cell priority levels ($PL_i$) using a buffer-based cell measurement and priority level assignment technique.

As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that [x] represents the integer part of x, if 1<x<7.

It can be seen by application of Equation [1] above that if a connection is exploiting network capacity in excess to the connection's negotiated NBR value, the priority level of cell$_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes, identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 4, there is illustrated in flow diagram form a general methodology by which a network node processes cells containing priority level information received from a UNI in accordance with one embodiment of the present invention. FIG. 5 illustrates an embodiment of various components of a network node employed to effectuate the methodology illustrated in FIG. 4. It is assumed that a cell, such as $cell_i$, has been processed at a UNI and includes priority level information derived in a manner described hereinabove.

$Cell_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level ($PL_a$) based on the occupancy state of the memory 90. In general, the memory manager 89 establishes a high allowable priority which translates to a low allowable priority "level," for example $PL_{a=0}$ or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example $PL_a=6$ or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 83 by the memory manager 89, the filter 88 discards 84 $cell_i$. If, on the other hand, the priority level of $cell_i$ is equal to or less than the allowable priority level $PL_a$, the filter 88 accepts 85 $cell_i$. The memory manager 89 coordinates the transfer 86 of $cell_i$ to the memory 90 and updates an index table 91 coupled to the memory manager 89 to include a new index table entry for newly accepted $cell_i$. In one embodiment, the index table 91 stores the location of the accepted $cell_i$ in the memory 90, and also stores a cell-type indicator which specifies whether $cell_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 6:
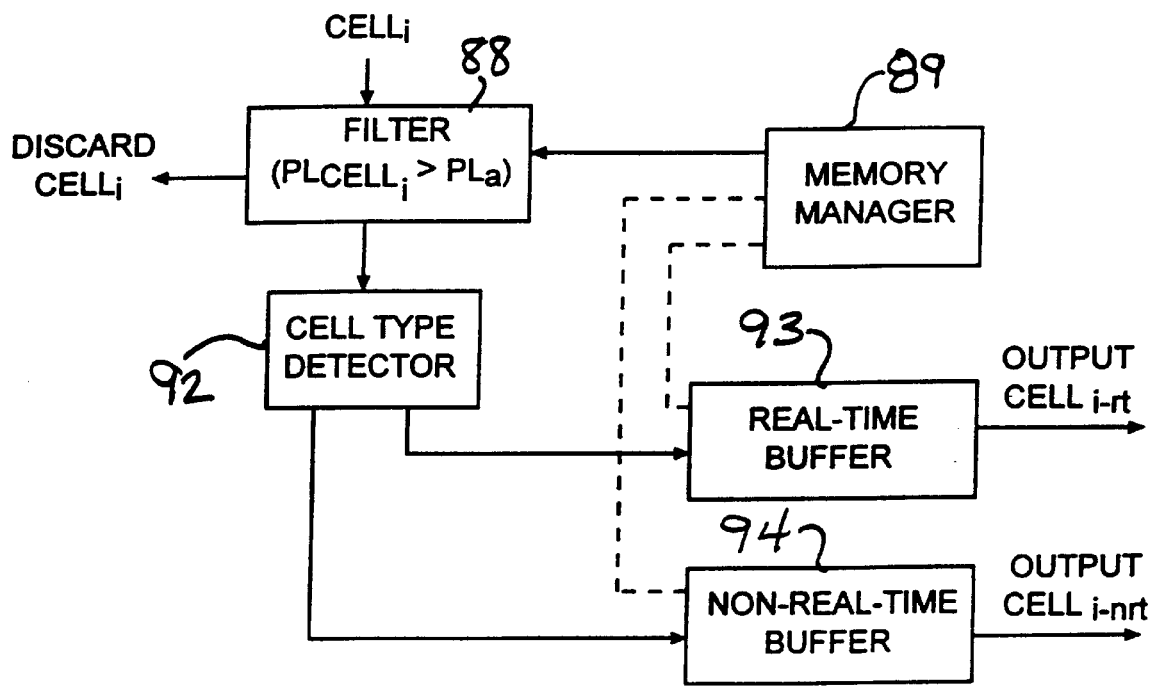
FIG. 6 is a block diagram of an alternative embodiment of a system for filtering cells at a network node in accordance with a nominal bit rate service.

As illustrated in FIG. 6, a memory manager 89 can determine the status of a real-time buffer (rt-buffer) 93 and a non-real-time buffer (nrt-buffer) 94. The memory manager 89 determines, in a manner similar to that previously described, the allowable priority level, $PL_a$, for the filter 88 based on the status of the rt-buffer 93 and the nrt-buffer 94. If the priority level of $cell_i$ is greater than the allowable priority level, $PL_a$, the filter 88 discards $cell_i$. If, on the other hand, the priority level of $cell_i$ is equal to or less than the allowable priority level, $PL_a$, $cell_i$ is accepted.

The network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines whether $cell_i$ is an rt-cell or an nrt-cell. As discussed previously, the header of cell includes a header bit, such as the CLP bit, which indicates whether or not cell is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

It may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

While a SIMA network as described above has many advantages and benefits, it does not account for the packet traffic burden that may affect the switching functions of a particular node. In a SIMA supported network, i.e., a network having nodes that account for various nominal bit rate priority levels, particular inputs may receive a disproportionately large volume of SIMA packets that will not ultimately be output from the node due to the overall load of the node. Further, in non-SIMA (e.g., conventional) network, certain inputs of the conventional network node can be designated for SIMA traffic. These dedicated inputs can also potentially be overburdened by SIMA traffic at that input.

In these cases where particular inputs receive a large quantity of SIMA packets, the network node receives and routes/switches all packet traffic, regardless of whether it will ultimately be accepted for output from the node. It would reduce bandwidth overhead if those packets that would likely be discarded at the node did not have to be routed/switched at the node. It would therefore be advantageous to restrict the packet traffic volume entering the node, rather than only controlling traffic volume exiting the node. The present invention provides for this opportunity.

Figure 7:
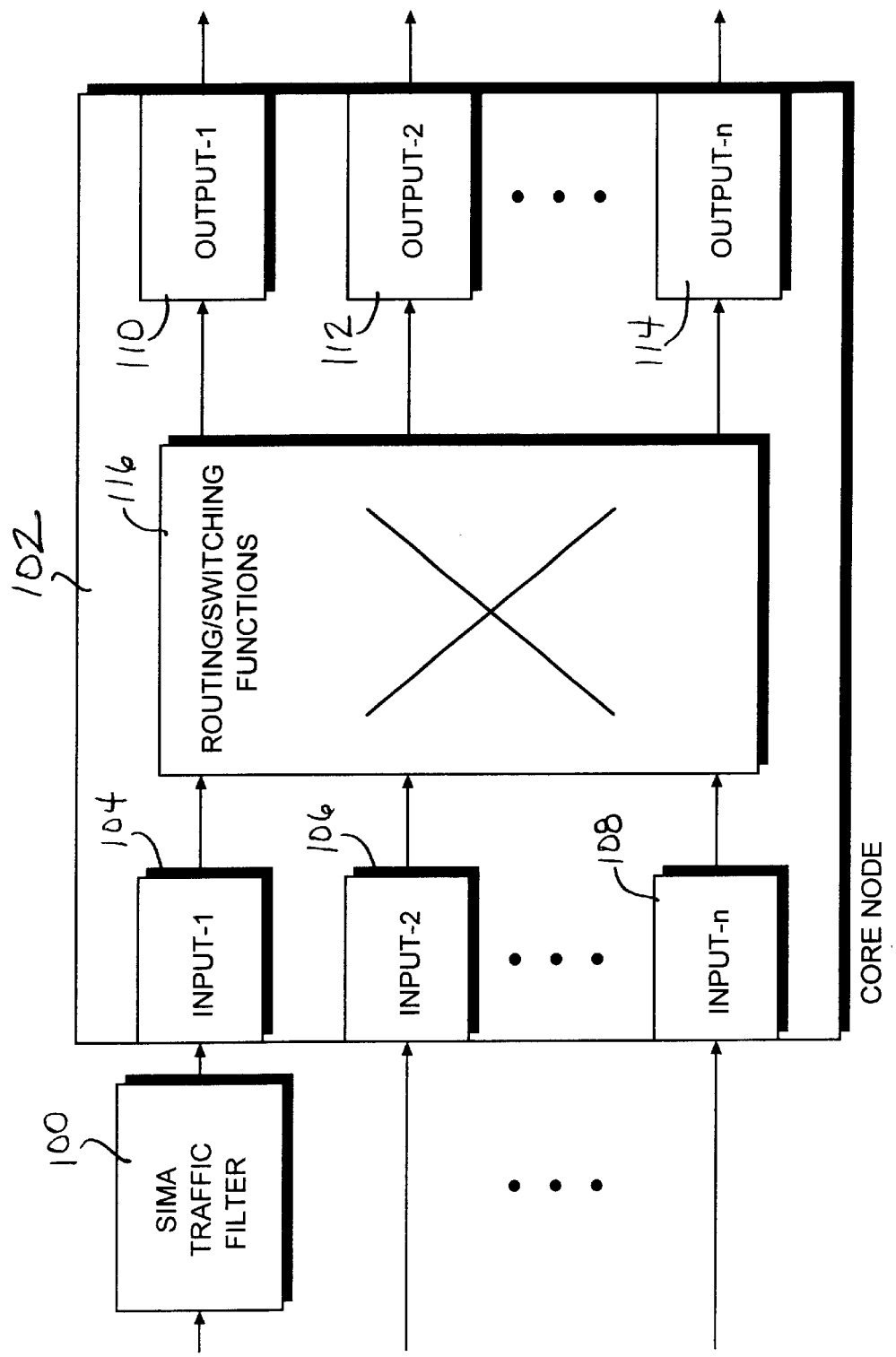
FIG. 7 is a block diagram of a SIMA traffic filter (STF) used in connection with a core SIMA network node in accordance with one embodiment of the present invention.

FIG. 7 is a block diagram of a SIMA traffic filter (STF) 100 used in connection with a core SIMA network node 102 in accordance with one embodiment of the present invention. The node 102 includes at least one input, shown in FIG. 7 as input-1 104, input-2 106 through input-n 108. The node 102 also includes at least one output, shown as output-1 110, output-2 112 through output-n 114. Inputs and outputs are selectively coupled via the routing and switching unit 1116. The node 102 illustrated in FIG. 7 represents either a SIMA network node, or a non-SIMA network node capable of supporting SIMA packets using a SIMA extension function. Such a SIMA extension function that allows a non-SIMA or conventional network to support SIMA traffic may be determined in a manner described herein and in copending U.S. patent application Ser. No. 09/209,138, entitled "System And Method For Managing Data Traffic Associated With Various Quality Of Service Principles Using A Conventional Network Node Switch ", which is assigned to the assignee of the instant application, the contents of which are incorporated herein by reference.

The STF 100 can be used with one or more inputs of the node. The STF 100 can be integrally configured as part of the network node itself, or alternatively may be a distinct device or functionality external to the network node as it is depicted in FIG. 7. Therefore, while the SIMA traffic filter may be considered part of the input of the network node, the nomenclature "input" hereinafter refers to a conventional input of a network node without the STF for purposes of clarity.

The STF 100 is a device of functional module that restricts the volume of SIMA packet traffic that is passed to the node 102. Its function is executed prior to conventional routing, multiplexing or other switching functions executed by the routing and switching unit 116, and therefore acts as a "pre-filter" function for the node. This alleviates congestion and overloading of such routing and switching functions performed by the network node. To restrict this traffic volume, the STF 100 selectively discards packets that are the most likely to be discarded by the cell scheduling and buffering units (SBUs) at each output of the node. The packets or cells most likely to be discarded at an SBU is determined using the priority level, or "drop preference", of each packet received.

Figures 8, 9:
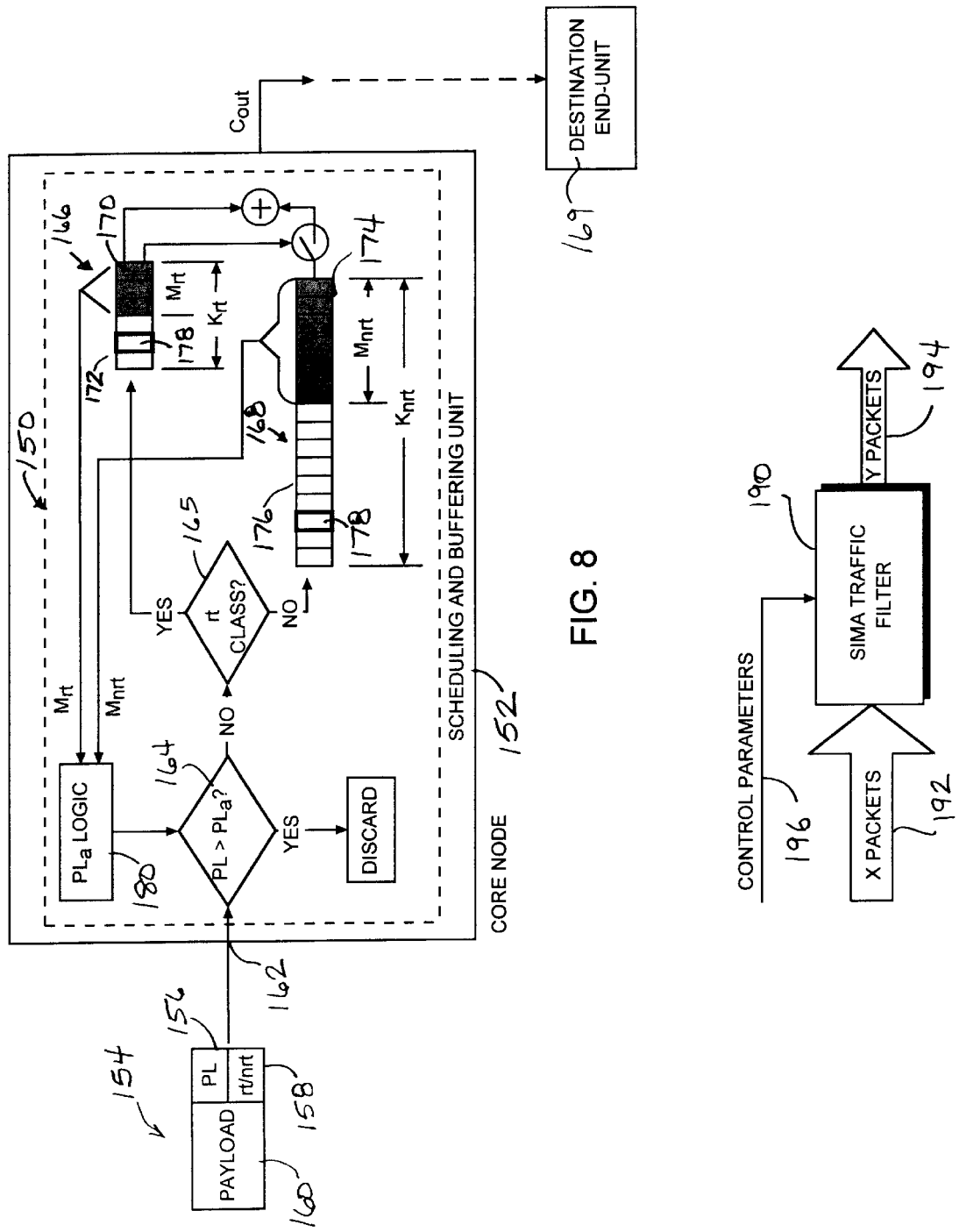
FIG. 8 is a block diagram of one embodiment of a cell scheduling and buffering unit (SBU) that selectively accepts or discards packets at the outputs of a node based on the priority level of the packet or cell.
FIG. 9 illustrates the packet filtering function of the STF which is performed at the input of a network node.

In order to better understand how packets or cells are selectively accepted or discarded at the output of a node, a cell scheduling and buffering unit (SBU) is illustrated in FIG. 8. FIG. 8 is a block diagram of one embodiment of an SBU 150 that selectively accepts or discards packets at the outputs of a node based on the priority level of the packet or cell. The SBU 150 also provides buffering for real-time and non-real time cells.

Each cell received at a core node 152 has associated with it a priority level previously established based on traffic conditions at a source user/network interface, such as UNI 24 described in connection with FIG. 2. In addition, each cell has associated with it a service class indicator which identifies the cell as containing real-time or non-real-time payload. The cell scheduling and buffering unit 150 provides for efficient processing of both real-time and non-real-time cells based solely on two external considerations: the priority level (i.e., drop preference) and the service class status of each cell.

As is illustrated in FIG. 8, a cell, such as cell$_i$ 154 includes a priority level (PL) 156, a real-time/non-real-time (rt/nrt) indicator 158, and a payload 160. The cell$_i$ 154 is received at an input 162 of the cell scheduling and buffering unit 150. A cell filter 164 determines the priority level of cell$_i$ 154 by reading the priority level bits PL 156 of the cell header. As part of the cell filtering procedure, the allowable priority level, $PL_a$, is computed based on the current status of typically two buffers provided in the cell scheduling and buffering unit 150.

In accordance with one embodiment of the SBU 150, two buffers, a real-time buffer 166 and a non-real-time buffer 168 are included. Packets or cells are directed to the appropriate buffer depending on the state of a designator in the cell which identifies the cell as a real-time or non-real-time cell. This is determined using the comparing function 165, which then routes the cell to the appropriate buffer. This routing function can be effected in various manners known in the art, e.g., by modifying the buffer destination address to direct the cell to the real-time or non-real-time buffer. The occupancy level of the two buffers 166, 168 is computed by determining the number of cells currently residing in the rt-buffer 166, denoted $M_{rt}$, and the number of cells currently residing in the nrt-buffer 168, denoted $M_{nrt}$. The cells are buffered prior to being output from the node 152 to the destination end-unit 169.

It is noted that the shaded portion of the rt-buffer 166 represents an occupied rt-buffer portion 170, while the unshaded section represents an unoccupied rt-buffer portion 172. Similarly, an occupied nrt-buffer portion 174 of the nrt-buffer 168 is indicated by the shaded region, whereas the unshaded region represents an unoccupied nrt-buffer portion 176. It is further noted that each of the buffers 166, 168 include a number of buffer locations 178, and that the number of non-real-time buffer locations defining the nrt-buffer 168 typically exceeds the number of buffer locations defining the rt-buffer 166.

For purposes of illustration, and not of limitation, the following buffer parameters are defined:

$M_{rt}$=the number of cells in the rt-buffer 166

$K_{rt}$=the number of buffer places in the rt-buffer 166

$M_{nrt}$=the number of cells in the nrt-buffer 168

$K_{nrt}$=the number of buffer places in nrt-buffer 168

A processor, represented as $PL_a$ logic 180, determines the number of cells currently occupying the rt-buffer 166 ($M_{rt}$) and the number of cells currently occupying the nrt-buffer 168 ($M_{nrt}$). The processor 180 also determines the number of buffer locations 178 defining the rt-buffer 166 ($K_{rt}$) and the number of buffer locations 178 defining the nrt-buffer 168 ($K_{nrt}$). The occupancy levels of the rt-buffer 166 ($x_{rt}$) and the nrt-buffer 168 ($x_{nrt}$) are respectively determined using Equations [2] and [3] below:

$$x_{rt} = M_{rt}/K_{rt}$$

$$x_{nrt} = M_{nrt}/K_{nrt} \qquad [2/3]$$

The average occupancy level of the total buffering system (x) is then determined by one of several ways, including, for example, by use of any of the following equations:

$$x = (x_{rt} + x_{nrt}) \quad (a)$$

$$x = \sqrt{x_{rt}^2 + x_{nrt}^2} \qquad (b)$$

$$x = \max(x_{rt}, x_{nrt}) \quad (c) \qquad [4(a)/(b)/(c)]$$

The priority level PL 156 of cell$_i$ 154 ($PL_{cell-i}$) is compared to the result produced from use of the following equation:

$$PL < a - bx \qquad [5]$$

where, a and b are constants, and it is assumed for purposes of this example that a=b=9. Cell$_i$ 154 is accepted or discarded depending on the result of the comparison performed using Equation [5] above.

It may be advantageous to determine the allowable priority level, $PL_a$, using an alternative approach. Initially, it is assumed that the occupancy level of the rt-buffer 166, $x_{rt}$, and that of the nrt-buffer 168, $x_{rt}$, are divided into N levels, where N may be, for example, 16 or 12. For purposes of illustration, Table 1 provided below assumes that the occupancy level of the two buffers 166, 168 are divided into N=12 levels. When a cell arrives at the cell scheduling and buffering unit 150, the scheduling processor 180 determines the current values of $M_{rt}$ and $M_{nrt}$. By use of a simple calculation, especially if $K_{rt}$, $K_{nrt}$, and N are of the form $2^n$, an estimate of the current occupancy level of both buffers 166, 168 may be obtained. These two values, $x_{rt}$ and $x_{nrt}$, determine the rows and columns of Table 1. The contents of each cell of TAble 1 represents the highest allowed priority level, $PL_a$, in view of the current status of the two buffers 166, 168 upon arrival of cell$_i$ 154.

TABLE 1

|  |  | [12$x_{rt}$] | | | | | | | | | | | |
| --- | --- | --- | --- | --- | --- | --- | --- | --- | --- | --- | --- | --- | --- |
|  |  | 0 | 1 | 2 | 3 | 4 | 5 | 6 | 7 | 8 | 9 | 10 | 11 | 12 |
| [12$x_{nrt}$] | 0 | 7 | 7 | 7 | 7 | 6 | 6 | 5 | 4 | 3 | 2 | 1 | 0 | — |
|  | 1 | 7 | 7 | 7 | 7 | 6 | 6 | 5 | 4 | 3 | 2 | 1 | 0 | — |
|  | 2 | 7 | 7 | 7 | 6 | 6 | 6 | 5 | 4 | 3 | 2 | 1 | 0 | — |
|  | 3 | 7 | 7 | 6 | 6 | 6 | 5 | 5 | 4 | 3 | 2 | 1 | 0 | — |
|  | 4 | 6 | 6 | 6 | 6 | 5 | 5 | 4 | 4 | 3 | 2 | 1 | 0 | — |
|  | 5 | 6 | 6 | 6 | 5 | 5 | 4 | 4 | 3 | 3 | 2 | 1 | 0 | — |
|  | 6 | 5 | 5 | 5 | 5 | 4 | 4 | 3 | 3 | 2 | 2 | 1 | 0 | — |
|  | 7 | 4 | 4 | 4 | 4 | 4 | 3 | 3 | 2 | 2 | 1 | 1 | 0 | — |
|  | 8 | 3 | 3 | 3 | 3 | 3 | 3 | 2 | 2 | 1 | 1 | 0 | 0 | — |
|  | 9 | 2 | 2 | 2 | 2 | 2 | 2 | 2 | 1 | 1 | 0 | 0 | 0 | — |
|  | 10 | 1 | 1 | 1 | 1 | 1 | 1 | 1 | 1 | 0 | 0 | 0 | 0 | — |
|  | 11 | 0 | 0 | 0 | 0 | 0 | 0 | 0 | 0 | 0 | 0 | 0 | 0 | — |
|  | 12 | — | — | — | — | — | — | — | — | — | — | — | — | — |

It can be seen that Table 1 provides a useful estimate of the highest allowed priority level, $PL_a$, which reflects both the status and the relative sizes of the rt-buffer 166 and the nrt-buffer 168. An array of the values of Table 1 may be stored and updated as needed in non-volatile memory within the node 152.

From the foregoing description of the cell scheduling and buffering unit (SBU) 150, it can be seen that packets having a priority level, or drop preference, that do not meet or exceed the allowable priority level at the node will be discarded. This implementation requires that routing and switching functions be performed on all packets prior to the packets reaching the SBU. The present invention reduces the volume of packets that require routing/switching, by filtering out packets that are likely to be discarded at the SBU before the switching functions are performed on those packets.

FIG. 9 illustrates the packet filtering function of the STF which is performed at the input of a network node. The input of the STF 190 includes a first number of packets or cells, represented as X PACKETS 192. The STF 190 provides an equal or lesser number of packets, represented as Y PACKETS 194, at the output of the STF 190. The packet reduction factor is based on a set of control parameters provided to the STF 190 as illustrated by input path 196. One objective of these control parameters is to determine the volume of packet traffic that the STF 190 will allow to pass to its output. Additionally, the control parameters can designate which of the packets will be allowed to advance to the STF 190 output, which in turn regulates the volume of packet traffic at the input of the corresponding network node.

In one embodiment of the invention, the control parameters are permanently set to a predetermined state to allow only those packets to pass that meet or exceed a predetermined threshold. For example, upon power up or initialization of the STF 190, the parameters can be set to allow passage of those packets having a priority, e.g. drop preference, greater than or equal to a predetermined drop preference. In another embodiment of the invention, the control parameters are dynamically configurable during network operation, as will be described more fully below.

Figure 10:
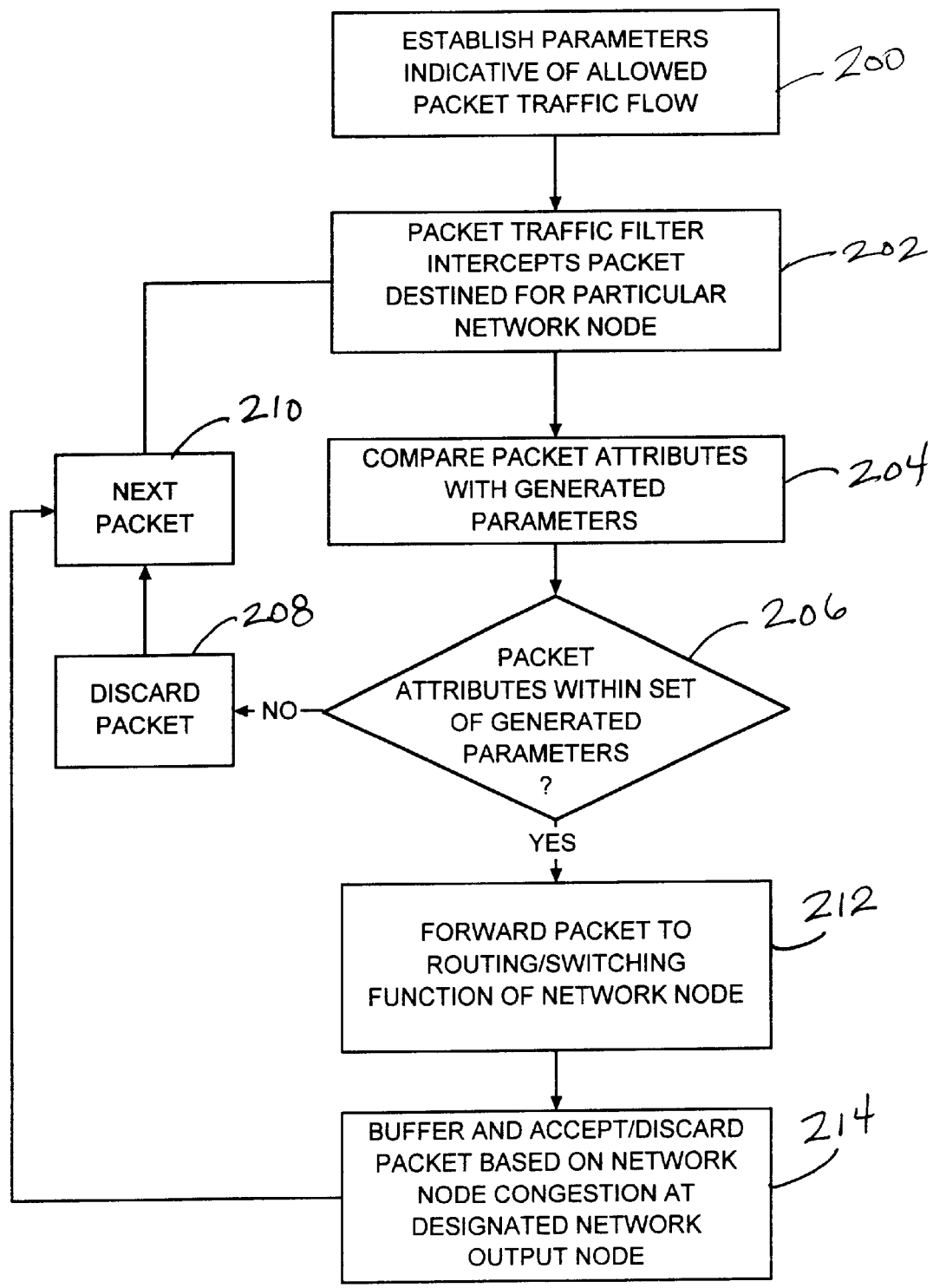
FIG. 10 is a flow diagram of one embodiment of a method for reducing packet traffic at a network node input.

Referring now to FIG. 10, a flow diagram of one embodiment of a method for reducing packet traffic at a network node input is provided. Parameters are established 200 that indicate an allowable packet traffic flow entering a particular one or more network nodes. These parameters, as described more fully below, are established in a predetermined manner, or alternatively are dynamically determined. For example, where incoming packets are SIMA priority-based packets, a predetermined priority level (i.e., drop preference) can be established as the parameter(s) of interest. Alternatively, the parameters can be established, and modified, according to certain network node characteristics such as its current congestion level, current packet output rate, ratio of real-time versus non-real time packets at the node, and the like.

A packet traffic filter, such as the SIMA Traffic Filter, intercepts 202 the packets prior to being routed or switched at the network node. The traffic filter compares 204 the attributes of the packet with the generated parameters. For example, where the selected parameter is a predetermined SIMA priority level, the predetermined SIMA priority level is compared to the SIMA priority level of the packet. It is determined 206 whether the packet attributes appropriately correspond to the generated parameters or range of parameters (e.g., whether the packet priority level is within the set of one or more priority level parameters). If not, the packet is discarded 208, and the next packet is intercepted by the traffic filter as seen at blocks 210 and 202. As will be appreciated by those skilled in the art from the foregoing description, the packet could alternatively be discarded where the packet attributes are not within the set of the priority level parameters. For example, the packet can be discarded where the generated parameter or parameter range differs from the priority level of the incoming packet. It should also be noted that while the flow diagram of FIG. 10 is illustrated as a sequential series of steps, it need not be executed in a strict sequential manner. For example, the next packet 210 entering the packet traffic filter can occur as soon as the previous packet has been processed at block 202, so that certain functions such as intercepting 202 and comparing 204 are executed in parallel for successive packets.

If the particular packet is within the set of generated parameters, the packet is input 212 to the routing/switching function of the network node. This indicates that the packet traffic filter accepted the packet based on the generated parameters. After the packet has been appropriately switched to its proper network node output, normal packet scheduling and buffering can be performed, as seen at block 214. For example, each node output equipped with an SBU (e.g., SBU 150 of FIG. 8) then accepts or discards individual packets based on the buffer occupancy levels (or other congestion indicators) corresponding to that particular virtual path.

The packet traffic filter therefore provides a "prefiltering" function to restrict the volume of packet traffic reaching the node, while still allowing more individualized packet filtering for individual paths based on actual node congestion (e.g., SBU).

Figure 11:
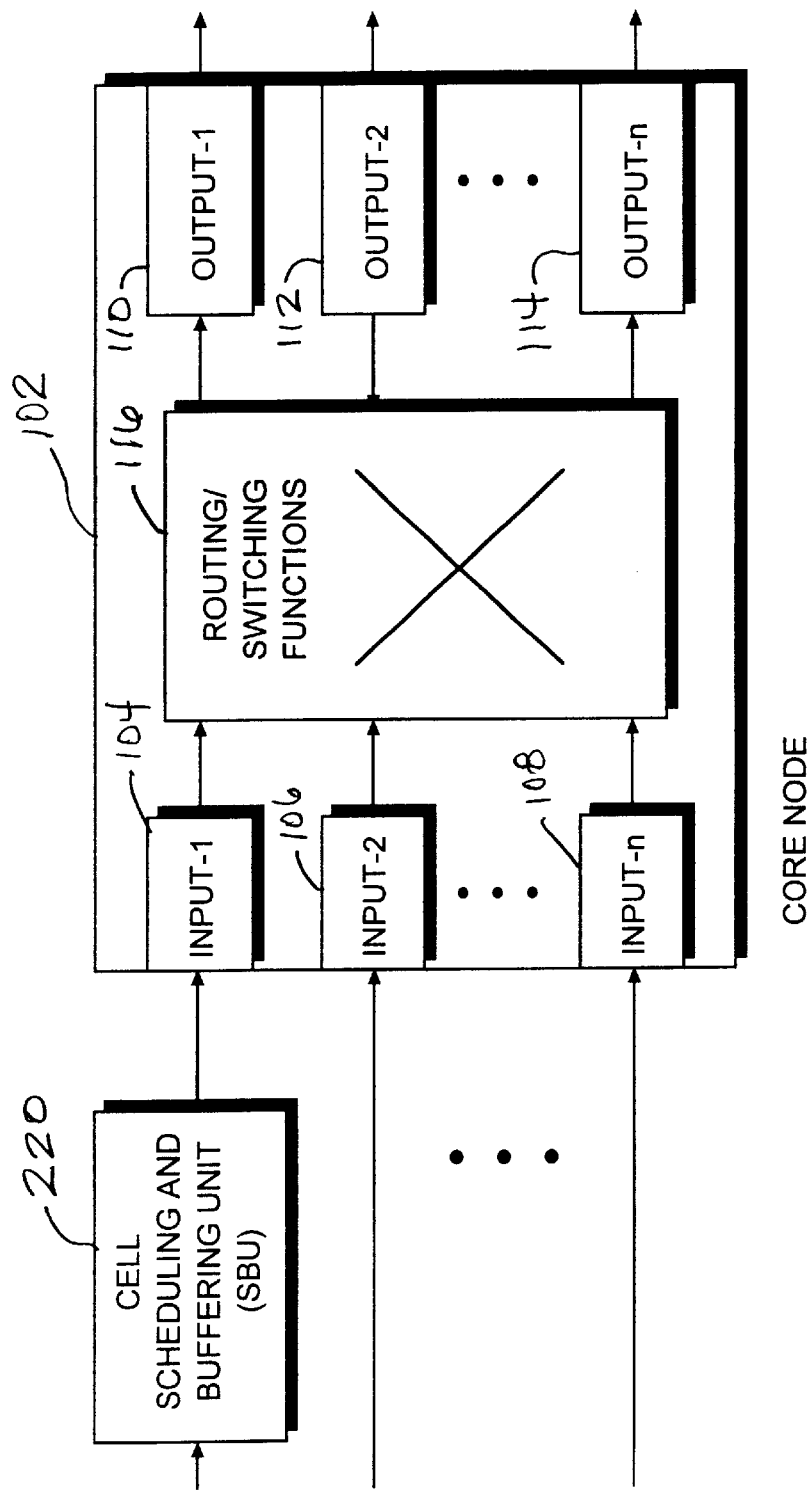
FIG. 11 illustrates one embodiment of a SIMA traffic filter used in connection with a network node, wherein a cell scheduling and buffering unit is used to prefilter packet traffic from a network node.

FIG. 11 illustrates one embodiment of a SIMA traffic filter used in connection with a network node. In the embodiment of FIG. 11, an SBU 220 is used to prefilter packet traffic from a network node. The core network node 102 is analogous to the core node 102 shown in FIG. 7. In this configuration, the SBU 220 is used as the STF. As described in connection with FIG. 8, an incoming cell or packet is discarded by the SBU 220 based on the priority PL of the cell and the accepted priority level $PL_a$. If $PL<PL_a$, the packet is discarded. The calculation of $PL_a$ is based on the occupancy level of the real-time and non-real-time buffers in the SBU 220.

When a packet has been accepted, it is sent to the real-time or non-real-time buffer based on a bit within the packet. The buffers are emptied at a rate of $C_{out}$. The output rate $C_{out}$ is a parameter that can be adjusted to suit the needs of the particular network node. Thus, the STF will ensure that the conventional input of a SIMA or non-SIMA network node receives traffic at the maximum rate $C_{out}$. If the SBU 220 acting as the SIMA traffic filter receives packets at a faster rate than $C_{out}$, the buffers of the SBU 220 will start to discard low priority traffic, prior to reaching the routing/switching functions 116.

Figure 12:
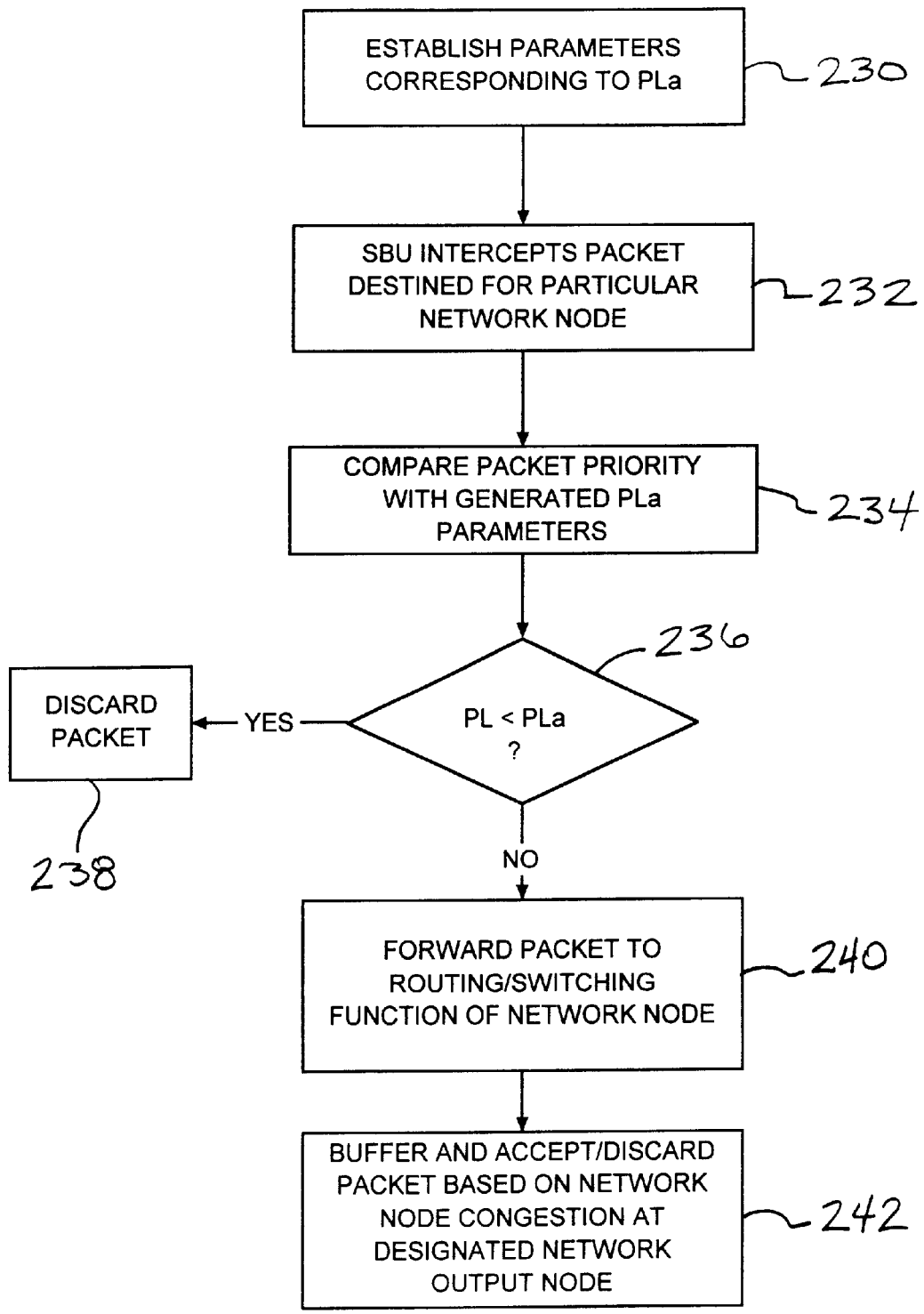
FIG. 12 is a flow diagram of one embodiment of a method for using an SBU as a SIMA traffic filter.

Referring to FIG. 12, a flow diagram of one embodiment of a method for using an SBU as a SIMA traffic filter is provided. The parameters established in this embodiment correspond to the allowable priority level $PL_a$ of the SBU/STF, and are based on the occupancy levels of the buffers, as seen at block 230. The SBU intercepts 232 the packet destined for the particular network node, and compares 234 the priority level of the packet to the allowable priority level of the SBU/STF. In one embodiment of the invention, the allowable priority level of the SBU/STF is determined based on the occupancy level of a buffer (e.g., buffers 166, 168) which temporarily stores the incoming packets. Where the priority level of the packet PL is less than the allowable priority level of the SBU/STF as determined at block 236, the packet is discarded 238. Otherwise, the packet is forwarded 240 to the routing/switching function of the network node. After the packet has been appropriately switched to its proper network node output, normal packet scheduling and buffering can be performed, as seen at block 242.

In another embodiment of the invention, the $PL_a$ is not dependent on the buffer occupancy levels of the SBU 220 that is operating as the STF. In such an embodiment, the $PL_a$ is fixed to a predetermined value, and is not a function of the real-time and non-real-time buffers. This could be used, for example, to prefilter only those packets having a very low priority.

Figure 13:
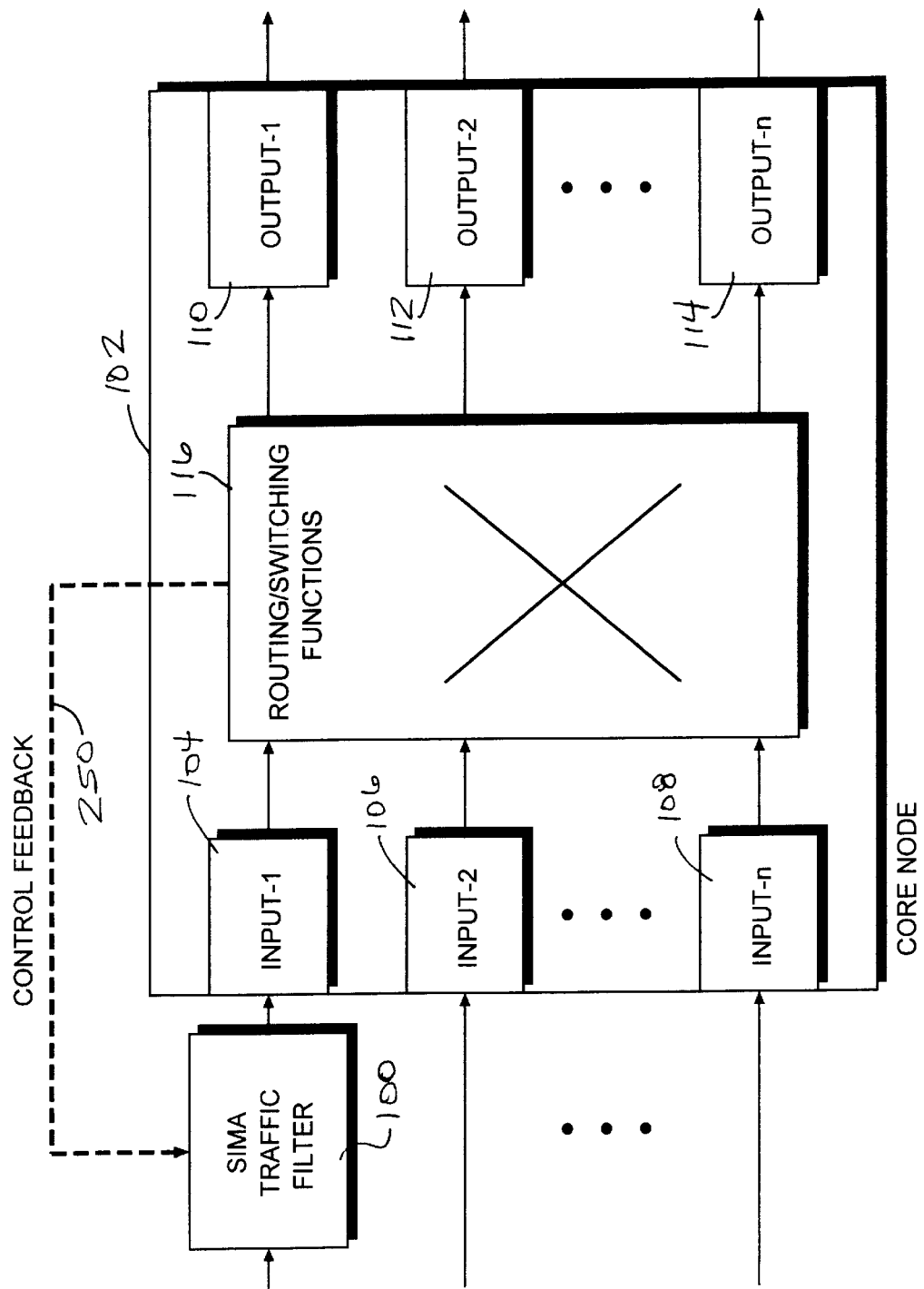
FIG. 13 illustrates another embodiment of a SIMA traffic filter used in connection with a network node, wherein the network node notifies the STF of a preferred rate of input to the network node.
Figure 14:
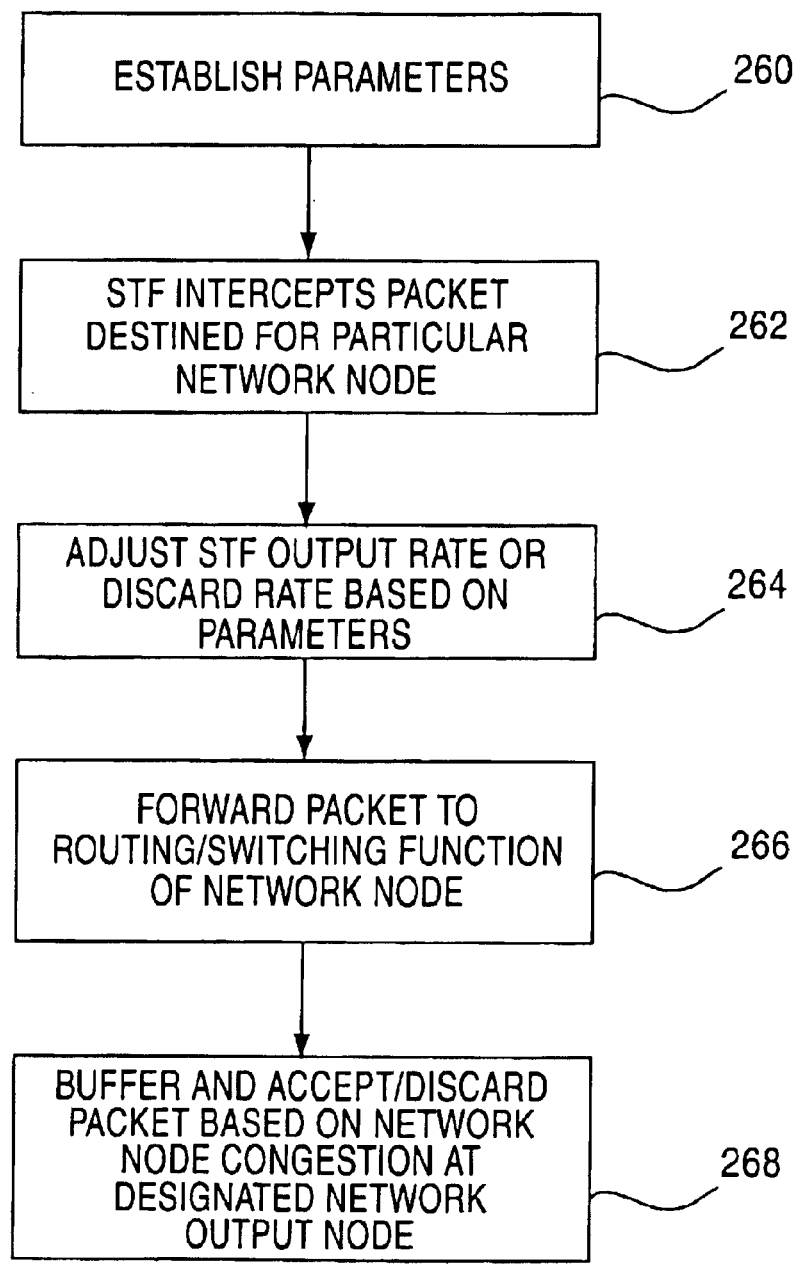
FIG. 14 is a flow diagram of one embodiment of a method implementing control feedback from a network node to a SIMA traffic filter.

FIG. 13 illustrates another embodiment of a SIMA traffic filter used in connection with a network node. In this embodiment of the invention, the network node 102 notifies the STF 100 of a preferred rate of input to the network node. Using control feedback shown on path 250, the network node 102 can control the rate of packets entering the input, (e.g., input-1 104) depending on the overall load at the network node 102. For example, when using an STF based on an SBU as described in connection with FIGS. 11 and 12, the network node can inform the STF 100 about a preferred output rate $C_{out}$ of the buffers. In this manner, the network node 102 may decrease the preferred output rate COU, of the STF 100 when the load at the node increases such that there is a need to reduce the SIMA traffic entering the node. Similarly, when the network node load decreases, the network node 102 can cause the STF 100 output rate $C_{out}$ to increase. This can be effected by manipulating the allowable priority level of the SBU/STF 100. This can also be effected by directly controlling the output rate of the SBU/STF 100, such as through an adjustable output enable mechanism Referring to FIG. 14, a flow diagram of one embodiment of a method implementing control feedback from a network node to a SIMA traffic filter is provided. The parameters established 260 in this embodiment correspond to the packet discard rate or the output rate of the STF, and are provided to the STF via a control feedback path. The STF intercepts 262 the packet destined for the particular network node, and adjusts 264 the output rate, or alternatively the packet discard rate, based on the feedback parameters. After the packet has been appropriately switched 266 to its proper network node output, normal packet scheduling and buffering can be performed 268.

It is also possible to implement a traffic filter that does not account for SIMA priority levels. For example, it is possible to use a SIMA traffic filter with a network node that does not support the SIMA service class. In such a case, the STF can be configured to prefilter packets based on other characteristics rather than the priority level, or drop preference, of the packet. One such example is illustrated in FIG. 15.

Figure 15:
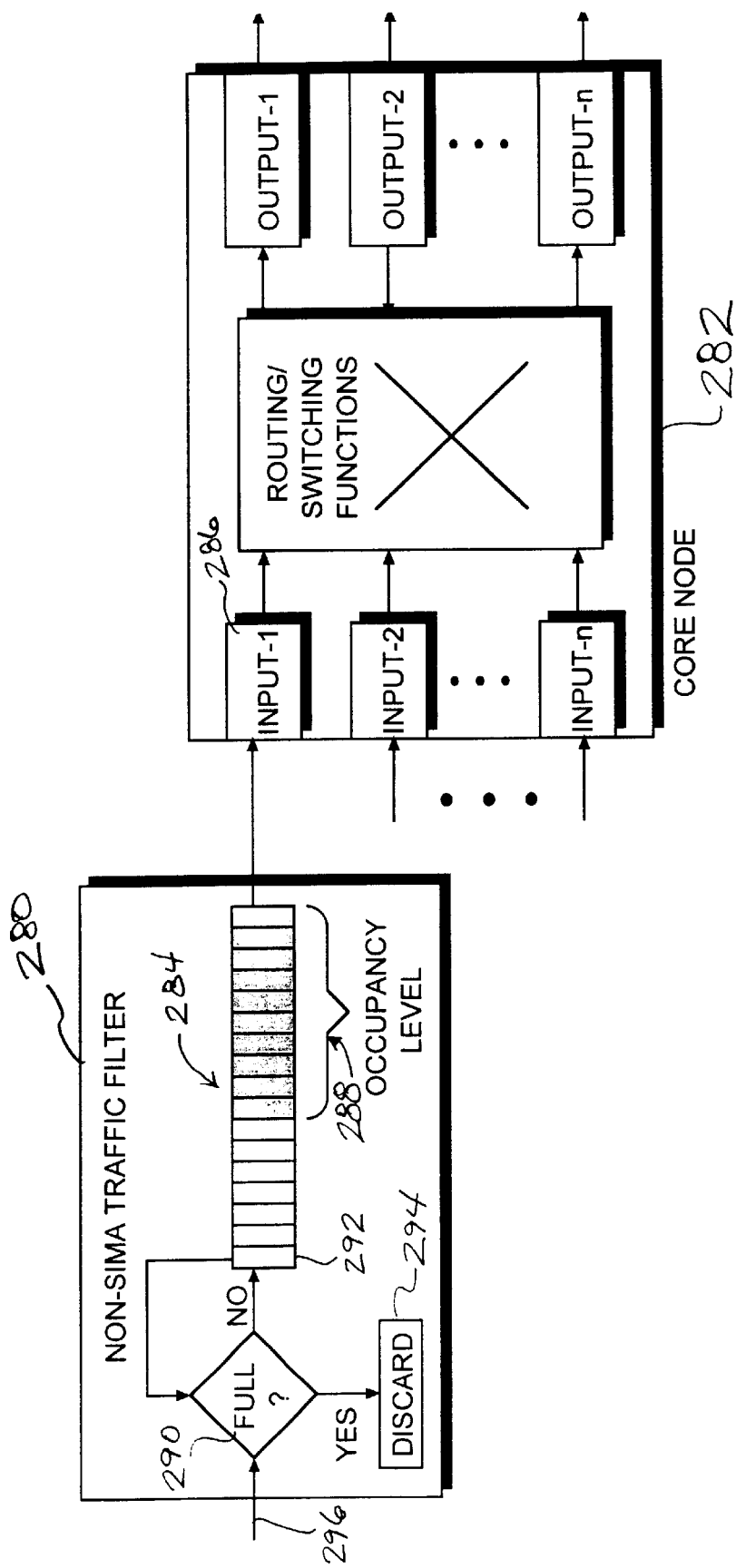
FIG. 15 is a diagram of a non-SIMA traffic filter used in connection with a core network node that does not support the SIMA service class priority levels.

FIG. 15 is a diagram of a non-SIMA traffic filter 280 used in connection with a core network node 282 that does not support the SIMA service class priority levels. The traffic filter 280 of FIG. 15 includes a "best effort" FIFO 284 that buffers the received packets and forwards to the input-1 286 of the core node 282. Any packet that cannot be accepted by the buffer 284 are discarded, so that the traffic filter accepts packets as long as the buffer has available capacity. Referring to FIG. 15, the occupancy level 288 of the buffer changes depending on the packet traffic volume. If the occupancy level 288 increases such that the buffer 284 completely fills, this can be detected as shown at function block 290. Whether the buffer is full can be determined in a variety of manners, including comparing the buffer 284 address pointer to the last known buffer 284 address, or monitoring the last buffer location 292. If the buffer location 292 becomes occupied, a buffer-full indication can be supplied to the function block 290, which recognizes that the buffer is full, and discards 294 new packets received via path 296. This embodiment operates as a traffic "fuse", in that it simply stops further packet traffic at a particular traffic level that is capable of filling the buffer 284. Such use is beneficial as a traffic overload safety feature.

Figure 16:
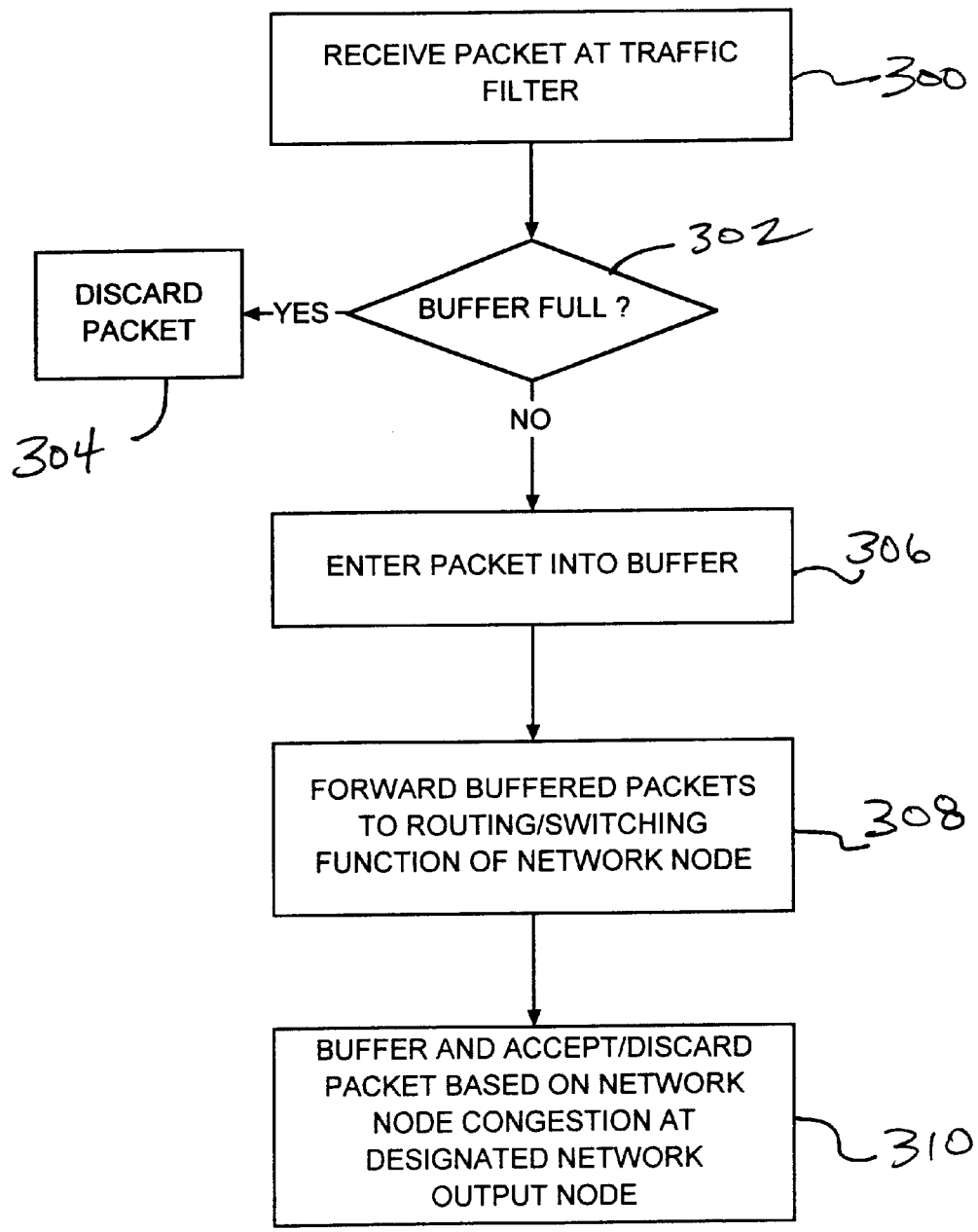
FIG. 16 is a flow diagram illustrating one embodiment of the use of a non-SIMA traffic filter with a core network node that does not support the SIMA service class priority levels.

FIG. 16 is a flow diagram illustrating one embodiment of the use of a non-SIMA traffic filter with a core network node that does not support the SIMA service class priority levels. Packets are received 300 at the traffic filter. In one embodiment of the invention, the buffer is a first-in-first-out (FIFO) queue. If the FIFO is full as determined at decision block 302, the current packet is discarded 304. If the FIFO is not full, the packet is entered 306 into the FIFO queue. From the FIFO queue, the packets are forwarded 308 to the routing/ switching function of the network node. After the packet has been appropriately switched to its proper network node output, normal packet scheduling and buffering can be performed, as seen at block 310.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. A method for use in a network having at least one network node capable of routing information packets between one or more node inputs and one or more node outputs, for reducing the volume of packets requiring processing by network packet functions of the network node, the method comprising:

intercepting the packets prior to their input to the network node;

filtering out a portion of the intercepted packets based on parameters corresponding to a probable packet acceptability at the network node; and forwarding a remaining portion of the intercepted packets to the network node for processing by the network packet functions, wherein filtering out the portion of the intercepted packets comprises:

receiving a feedback of the parameters from the network node; and adjusting an output rate into the corresponding input of the network node based on the parameters.

2. The method of claim 1, wherein receiving the feedback of the parameters comprises dynamically modifying the parameters at the network node based on a load condition of the network node.

3. A method for use in a network having at least one network node capable of routing information packets between one or more node inputs and one or more node outputs, for reducing the volume of packets requiring processing by network packet functions of the network node, the method comprising:

establishing parameters indicative of a desired packet traffic flow;

intercepting the packets destined for a particular one of the inputs of the network node prior to their input to the particular input;

comparing attributes of the intercepted packets with the established parameters to determine whether the attributes conform to the established parameters;

discarding the intercepted packets whose attributes do not conform to the established parameters;

forwarding the intercepted packets, whose attributes conform to the established parameters, to the particular input to which the intercepted packet was destined;

generating the parameters at the network node based on a node congestion level; and providing feedback of the generated parameters for comparison to the attributes of the intercepted packets.

4. A packet pre-filtering device, for use in a network having at least one network node capable of routing information packets between one or more network node inputs and one or more network node outputs, comprising:

a packet filter input to intercept the packets destined for a particular one of the network node inputs, wherein the packets include a packet priority value;

a control input to receive parameters corresponding to a packet acceptance threshold;

a comparator coupled to receive and compare the packet acceptance threshold and the packet priority values from the intercepted packets;

a packet filter output to forward the intercepted packets having a packet priority value within the packet acceptance threshold to the particular one of the network node inputs to which the intercepted packet was destined; and at least one packet buffer to receive the intercepted packets and to generate the packet acceptance threshold based on an occupancy level of the at least one packet buffer, wherein the at least one packet buffer comprises:

a real-time packet buffer to receive and buffer real-time packets; and a non-real-time packet buffer to receive and buffer non-real-time packets.

5. The packet pre-filtering device as in claim 4, further comprising:

a comparator to compare a real-time designator in each of the intercepted packets to a predetermined real-time indicator;

a packet router to route each of the intercepted packets to one of the real-time packet buffer and the-non-real-time packet buffer based on the result of the comparison of the real-time designator and the predetermined real-time indicator;

a processing unit coupled to receive an indication of the occupancy level of each of the real-time and non-real-time packet buffers, and to generate the packet acceptance threshold in response thereto.

6. The packet pre-filtering device as in claim 4, wherein:

each of the network nodes comprises a packet routing and switching unit to selectively route the intercepted packets to one or more of the network node outputs and to provide an indication of the overall load at the network node; and the control input is coupled to the routing and switching unit to receive the packet acceptance threshold via a feedback signal of the indication of the overall load at the network node.

7. The packet pre-filtering device as in claim 6, further comprising at least one packet buffer to receive the intercepted packets, wherein the packet buffer includes a variable rate packet output controlled by the overall load indication at the control input.

8. A method for use in a network having at least one network node capable of routing information packets between one or more node inputs and one or more node outputs, for reducing the volume of packets requiring processing by network packet functions of the network node, the method comprising:

intercepting the packets prior to their input to the network node;

filtering out a portion of the intercepted packets based on parameters corresponding to a probable packet acceptability at the network node; and forwarding a remaining portion of the intercepted packets to the network node for processing by the network packet functions, wherein filtering out the portion of the intercepted packets comprises:

receiving a feedback of the parameters from the network node; and adjusting a packet discard rate based on the parameter.

* * * * *